_United States Patent_ [19]

Klosowski et al.

[11] Patent Number: 4,657,967

[45] Date of Patent: Apr. 14, 1987

[54] ROOM TEMPERATURE CURING COMPOSITIONS CONTAINING TETRAFUNCTIONAL ETHOXY-KETOXIMO SILANE CROSSLINKERS

[75] Inventors: Jerome M. Klosowski, Monitor Township, Bay County; Michael D. Meddaugh; Paul B. Sykes, both of Midland; Antony P. Wright, Mills Township, Midland County, all of Mich.

[73] Assignee: Dow Corning Corporation, Midland, Mich.

[21] Appl. No.: 849,231

[22] Filed: Apr. 7, 1986

[51] Int. Cl.$^4$ .............................................. C08L 83/04
[52] U.S. Cl. ................................... 524/860; 524/425; 524/493; 524/588; 524/859; 528/17; 528/18; 528/19; 528/33; 528/34
[58] Field of Search ....................... 528/17, 18, 19, 33, 528/34; 524/425, 493, 588, 859, 860

[56] References Cited

U.S. PATENT DOCUMENTS 3,189,576 6/1965 Sweet ..................................... 528/34
4,371,682 2/1983 Hashimoto ........................... 528/34

FOREIGN PATENT DOCUMENTS 98369 1/1984 European Pat. Off. .
39967 10/1974 Japan .

_Primary Examiner_—Melvyn I. Marquis
_Attorney, Agent, or Firm_—Roger H. Borrousch

[57] ABSTRACT

Compositions of hydroxyl endblocked polydiorganosiloxanes and tetrafunctional ethoxy-ketoximo silane mixtures containing tetraketoximosilane, monoethoxytriketoximosilane, diethoxydiketoximosilane, and triethoxymonoketoximosilane provide one package room temperature compositions. Exposing these compositions to moisture results in a rapid cure without the use of a curing catalyst.

44 Claims, No Drawings

ROOM TEMPERATURE CURING COMPOSITIONS CONTAINING TETRAFUNCTIONAL ETHOXY-KETOXIMO SILANE CROSSLINKERS

BACKGROUND OF THE INVENTION

1. Field of the Invention

This invention relates to compositions which cure at room temperature to elastomeric type products.

2. Background Information

Many kinds of very useful compositions cure at room temperature to elastomeric materials having a broad spectrum of physical and chemical properties. However, with every desirable property, there seems to be undesirable properties and one is continually faced with the problem of choosing the right composition for the specific application. The application to which room temperature curing compositions can be put, keep increasing, and with the increasing variety of applications, the specific kinds of properties required, keep changing. The need for new room temperature curing compositions with new properties is thus in demand. The market is continually looking for the new desirable properties without the same previous undesirable properties.

One kind of room temperature curing composition is described by Sweet in U.S. Pat. No. 3,189,576, issued June 15, 1965. Sweet describes oxime silane crosslinkers which are useful to make room temperature curing compositions. Oximo and ketoximo are considered the same group. Sweet teaches trifunctional ketoximo silanes and tetrafunctional ketoximo silanes as crosslinkers. These crosslinkers can be used to make room temperature curing silicone elastomeric compositions by mixing them with hydroxyl endblocked polydiorganosiloxane. The compositions can also contain fillers and curing catalysts. The Sweet method of making the ketoximo silanes is reacting chlorosilanes with ketoxime in the presence of an acid acceptor. This method can be used to make the silanes, but the method was found to be hazardous because it produced an exotherm which could result in an explosion. Although the resulting products are desirable, the method limited the usefulness of the ketoximo silanes as crosslinkers in room temperature curing compositions.

Wada et al. in Japanese Patent Publication No. 49[1974]39967, published Oct. 30, 1974, teach oxime containing silanes. Wada et al. teach that the method of manufacturing organosilanes containing oxime groups bonded directly to the silicon atom is reacting tetrachlorosilanes and methyltrichlorosilanes with oximes in the presence of an acid acceptor and a solvent. Wada et al. teach that this method had some difficulties. Wada et al. report that the method requires a tremendous quantity of solvent, a tremendous quantity of amine which is toxic and has a disagreeable odor, requires an anhydrous environment, requires special equipment to filter the reaction product and keep the conditions anhydrous, and requires extremely difficult measures to remove the salts of amine and hydrogen chloride. Wada et al. teach that these shortcomings can be overcome if the following method for the manufacture of organosilanes which contain oxime bonded directly to silicon atoms is used. This new method by Wada et al. is demethanolating $R'_aSi(OCH_3)_{4-a}$ with an oxime of the formula X=NOH, where a is 0 or 1, R' is hydrocarbon, halogenated hydrocarbon, or cyanohydrocarbon, and X is $R'_2C=$ or $R''C=$ where $R''$ is a divalent hydrocarbon group or halogenated hydrocarbon group. A catalyst can be used if necessary for the demethanolation. The product obtained by Wada et al. has the following formula $$R'_aSi(OCH_3)_b(ONC=X)_{4-(a+b)}.$$

Wada et al. teach that it is conceivable to use alkoxysilanes such as ethoxysilane, propoxysilane, and butoxysilane instead of the starting methoxysilane, but that none of these other alkoxysilanes seem appropriate for use in their method. For example, when ethoxysilane is used, the deethanolating reaction proceeds minimally and it is difficult to obtain the intended organosilane which contains an oxime group. Wada et al. report that the propoxysilane and the butoxysilane hardly react at all.

Hashimoto in U.S. Pat. No. 4,371,682, issued Feb. 1, 1983, teaches a room temperature curable polyorganosiloxane composition containing as the crosslinker an oxime containing compound produced by an oxime radical-methoxyl radical exchange reaction using an oxime radical containing compound of the formula $$R'_aSi(ON=X)_{4-a}$$

and a methoxyl radical containing compound of the formula $$R'_bSi(OCH_3)_{4-b}$$

in which b is 0 or 1 and the ratio of the oxime radical to the methoxyl radical is from 1:0.2 to 1:2. Hashimoto teaches that using the reaction product provides a room temperature curing composition which cures faster when exposed to moisture. Hashimoto's composition requires the presence of a curing catalyst in order to obtain a cured product in a short period of time.

Chempolil et al. in European Patent Application No. 98,369, published Jan. 18, 1984, teach a process for making alkoxyoximinosilanes by reacting a silicon halide of the formula $R_{4-n}SiY_n$ where n is an integer of 2 to 4 with an alcohol having 1 to 24 carbon atoms and an oxime of the formula $R'_2C=NOH$ to produce at least one alkoxyoximinosilane of the formula $$R_{4-n}Si(OR)_p(ON=CR'_2)_{n-p}$$

where p is an integer of 1 to 3, but is at least one less than n and the hydrohalide of the oxime byproduct. The molar ratio of alcohol to silicon halide is m:1, wherein m is at least 0.1 n and less than n, and the molar ratio of oxime to silicon halide is at least (2n-m):1. Chempolil et al., however, do not show any tetrafunctional silanes and the resulting products. The difficulty with chlorosilanes and byproducts has not been overcome by the process of Chempolil et al.

SUMMARY OF THE INVENTION

An object of the present invention is to produce a room temperature curing composition which cures rapidly without a curing catalyst, has good reversion resistance, uses nontoxic ingredients, and good package stability.

This invention relates to a composition comprising a product which is storage stable in a package when protected from moisture but cures when removed from the package and exposed to moisture and which is obtained by mixing the following ingredients (A) a hydroxyl endblocked polydiorganosiloxane having an average viscosity at 25° C. of from 0.5 to 100 Pa.s and the organic radicals bonded to the silicon atom are selected from the group consisting of monovalent hydrocarbon radicals and monovalent halogenated hydrocarbon radicals, and (B) a tetrafunctional ethoxy-ketoximo silane mixture of 0 to 80 weight percent of tetraketoximosilane, 20 to 70 weight percent of monoethoxytriketoximosilane, 1 to 60 weight percent of diethoxydiketoximosilane, and 0 to 20 weight percent triethoxymonoketoximosilane in which the ketoximo groups have a formula —O—N=CR'R' in which each R' is an alkyl radical having from 1 to 4 carbon atoms, the amount of ingredient (B) being present in an amount sufficient to provide at least 0.8 moles of tetrafunctional ethoxy-ketoximo silane per mole of hydroxyl group in (A).

DETAILED DESCRIPTION OF THE INVENTION

The compositions of the present invention are stable at room temperature when protected from moisture, but cure when exposed to moisture. The composition can be protected from moisture by placing the composition in a package which is sealed and does not allow moisture to enter, including and especially atmospheric moisture. The composition of the present invention should not be made with ingredients which contain quantities of water which will effect the storage stability. The presence of water-containing ingredients in the compositions will cause the composition to cure in the storage package and thus the composition will not be a useful material. Compositions which can be stored in a single package and later cured by extruding the composition from the package and allowing moisture to contact it, are known as one package compositions or one component compositions or one-part compositions.

The compositions of the present inventions contain at least two ingredients, (A) a hydroxyl endblocked polydiorganosiloxane and (B) a tetrafunctional ethoxy-ketoximo silane. Compositions containing these two ingredients will cure rapidly at room temperature without the requirement of a curing catalyst, such as in less than 30 minutes it will skin over when exposed to atmospheric moisture and will become tack-free in as little time, as one hour.

The hydroxyl endblocked polydiorganosiloxanes of (A) can be those which have an average viscosity at 25° C. of 0.5 to 100 Pa.s, preferably from 1 to 50 Pa.s. The organic radical of the polydiorganosiloxane can be monovalent hydrocarbon radicals or monovalent halogenated hydrocarbon radicals. Examples of the monovalent hydrocarbon radicals are methyl, ethyl, propyl, butyl, phenyl, vinyl, allyl, cyclohexyl, tolyl, and isopropyl. Examples of monovalent halogenated hydrocarbon radicals are chloropropyl, 3,3,3-trifluoropropyl, chlorophenyl, beta-(perfluorobutyl)ethyl, and chlorocyclohexyl. Preferably, the organic radicals are methyl, vinyl, ethyl, phenyl, and 3,3,3-trifluoropropyl. The polydiorganosiloxane can contain in addition to the diorganosiloxane units, monoorganosilsesquioxane units, triorganosiloxy units, and $SiO_2$ units. The polydiorganosiloxanes which contain triorganosiloxy units can be partially endblocked such that the some of the endblocking groups are triorganosiloxy units and some are hydroxyl groups. For example, these polydiorganosiloxanes which have both hydroxyl endblocking and triorganosiloxy endblocking are known in the art from U.S. Pat. No. 3,274,145, by Dupree, issued Sept. 20, 1966 which is hereby incorporated by reference to show these polymers and their preparation. The units other than the diorganosiloxane units are preferably present in small amounts, such as less than 5 mol percent of the total units present. (A) can be a mixture of two or more polydiorganosiloxanes, as long as, the average viscosity of the mixture falls within the range of viscosities state above. For example, (A) can consist of a mixture of two polydimethylsiloxanes of different viscosities, or (A) can consist of polydimethylsiloxane, polymethylphenylsiloxane, and polymethylvinylsiloxane all being hydroxyl endblocked. The viscosity of (A) can result from a mixture of two or more hydroxyl endblocked polydiorganosiloxanes wherein some of the polymers can have a viscosity less than 0.5 Pa.s, such as 0.08 Pa.s, or greater than 100 Pa.s, such as gum viscosities (>1,000 Pa.s), as long as the average viscosity at 25° C. of (A) is in the range of from 0.5 Pa.s to 100 Pa.s. The mixtures of polydiorganosiloxanes in (A) can provide properties to the uncured composition, as well as, to the cured product. Such properties can be flow characteristics of the uncured composition where low viscosities can provide plasticizing properties and high viscosities can provide thixotropic properties. The cured products can have improved reversion properties and the modulus can be controlled by using mixtures of polydiorganosiloxanes for (A).

The tetrafunctional ethoxy-ketoximo silane, (B), is a mixture of silane species, namely 0 to 80 weight percent tetraketoximosilane, 20 to 70 weight percent monoethoxytriketoximosilane, 1 to 60 weight percent diethoxydiketoximosilane, and 0 to 20 weight percent triethoxymonoketoximosilane. The ketoximo group has the formula —O—N=CR'R' where each R' is methyl, ethyl, propyl, isopropyl, or butyl, and can be any of those ordinarily used in making ketoximosilanes, such as methylethylketoximo, dimethylketoximo, and diethylketoximo. The preferred ketoximo group is the methylethylketoximo group. The preferred (B) is a mixture of 2 to 40 weight percent tetraketoximosilane, 45 to 65 weight percent monoethoxytriketoximosilane, 8 to 45 weight percent diethoxydiketoximosilane, and 0 to 8 weight percent triethoxymonoketoximosilane. The optimum adhesion properties are obtained using a mixture of 5 to 15 weight percent tetraketoximosilane, 55 to 60 weight percent monoethoxytriketoximoxilane, 22 to 35 weight percent diethoxydiketoximosilane, and 1 to 3 weight percent triethoxymonoketoximosilane.

The tetrafunctional ethoxy-ketoximo silanes can be made by heating a mixture of ethylorthosilicate and ketoxime in an azeotroping solvent, such as toluene, to reflux which removes the ethanol as it is formed. This reflux is necessary because the reaction equilibrium lies far to the left of the reaction equation and the ethanol must be removed as it is formed to drive the reaction to the tetrafunctional ethoxyketoximo silanes used in this invention. The reflux temperature at the head is preferably held below 100° C. to prevent the product from decomposing. This reaction can take long periods of time to obtain mixtures with large quantities of tetraketoximosilane, such as above 50 weight percent can require more than 12 hours. The reaction equation in a simple form is as follows:

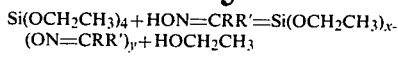

$$Si(OCH_2CH_3)_4 + HON=CRR' = Si(OCH_2CH_3)_x-(ON=CRR')_y + HOCH_2CH_3$$

The ketoxime is used in an excess amount to force the reaction to the right. The values of the subscripts x and y are such as to provide the mixtures as claimed herein, that is x can be 0, 1, 2, or 3 and y can be 1, 2, 3, or 4 in each molecule of the mixture.

The compositions of the presence invention can also contain a filler. The filler can be an extending filler or a reinforcing filler. Extending fillers can be calcium carbonate, diatomaceous earth, titanium dioxide, alumina, crushed quartz, and iron oxide. Examples of reinforcing fillers are fumed silica, precipitated silica, and carbon black. The reinforcing silicas can be treated to provide a hydrophobic filler surface. The other fillers may also be treated. The amounts of the filler can vary broadly from as little as one part by weight per 100 parts by weight of (A) to more than 100 parts by weight of filler per 100 parts by weight of (A). The extending fillers can be used in larger quantities than the reinforcing fillers and can be present in amounts of 200 parts by weight or more. The amounts of the fillers used will depend upon the particular properties wanted in the final cured product. The reinforcing fillers provide a more thixotropic characteristic to the uncured composition and provide higher tensile strengths to the cured products than do the extending fillers. Mixtures of filler can be used such as a preferred mixture is reinforcing silica and calcium carbonate.

The compositions of this invention can also have curing catalyst. The curing catalyst is used in particular situations in which the composition in a specific application may require faster curing, a surface which is tack free in a short time (dry surface, not sticky), and where a modulus change is necessary to meet certain use characteristics. However, one advantage of this inventive composition is that a curing catalyst is not necessary for most applications. These compositions cure fast to tack free surfaces, have resistance to reversion in confined areas especially under high temperature conditions, have improved heat stability, and have better adhesion to metals such as aluminum and steel than other ketoxime systems and other methoxy systems. Many of these characteristics result because curing catalysts which can cause reversion are not necessary for curing. These curing catalysts which can cause reversion include the metal carboxylates, such as tin carboxylates, dibutyltindiacetate, dibutyltindilaurate, and stannous octoate and other metal carboxylates such as lead carboxylates and zinc carboxylates. Other curing catalysts which can cause reversion include amines. If a curing catalyst is necessary, a non-reversion curing catalyst is preferred. Non-reversion curing catalyst include the organotitanates, such as tetrabutyl titanate, tetraisopropyl titanate, bis-(acetylacetonate)-diisopropyl titanate and other chelated catalysts. The preferred non-reversion catalysts are the organotitanates. The tetraalkoxytitanates are well known and examples can be found in U.S. Pat. No. 3,151,099, by Ceyzeriat et al., issued Sept. 29, 1964, which is hereby incorporated by reference to show the titanate catalysts. The chelated titanates are also well known and examples can be found in U.S. Pat. No. 3,334,067, by Weyenberg, issued Aug. 1, 1967 and in U.S. Pat. No. 3,689,454, by Smith et al., issued Sept. 5, 1972, both of which are hereby incorporated by reference to show the chelated titanate catalysts.

Other ingredients can also be used in the compositions of the present invention, such as heat stability additives, plasticizers, pigments and other colorants, adhesion promoters, solvents, and flame retardant additives. These ingredients should not be used if they cause the uncured composition to cure in the package, not to cure when exposed to moisture, or to cure to a product which has inferior properties for the intended utility.

The compositions of this invention are made by mixing ingredients (A) and (B) in amounts sufficient to provide a one package composition which is stable in the absence of moisture and which cures to an elastomeric material when exposed to moisture. The compositions of the present invention are preferably prepared by mixing (A) and (B) under anhydrous conditions, i.e., the ingredients which are used, such as the polydiorganosiloxane, fillers, and catalysts should not contain amounts of moisture or water which will cause the composition to cure in the storage package. The compositions should also be mixed under conditions which does not allow the entrance of moisture into the system in an amount sufficient to cause the mixture to have deleterious storage properties, curing properties, or cured properties. After the compositions are made, they are stored in packages which keep moisture out. The longest storage stability times can be obtained by making and storing the compositions under conditions which are free from moisture and water. The better the composition is maintained under anhydrous conditions, the longer the time the composition will remain uncured in the storage package. The compositions can also be protected from moisture entering the composition incidentally and accidentally by using an excess of ingredient (B). The compositions of this invention result from mixtures of (A) and (B) in which at least 0.8 moles of tetrafunctional ethoxy-ketoximo silane are present per mole of hydroxyl group in (A). The compositions which contain from 0.8 to 1.0 moles of silane per mole of hydroxyl group are the most difficult to maintain in a storage stable condition because small amounts of water entering the composition either during preparation or during storage can result in a cured product. However, if careful attention is given to the preparation and the storage package, these composition can be made. Preferably, the compositions of this invention are those which contain at least one mole of silane per mole of hydroxyl group. These compositions are not as sensitive to the entrance of moisture in very small amounts as are those compositions which have 0.8 to 1 mole of silane per mole of hydroxyl group. Most preferably, the compositions of this invention are those which have greater than one mole of silane per mole of hydroxyl group, such as >1.2 moles of silane per mole of hydroxyl group.

The compositions of this invention cure to elastomeric material, such as rubbery sealants, caulking materials, adhesives, coatings, and encapsulating materials. An advantage of the compositions of this invention is that they cure rapidly without the presence of a curing catalyst, especially without a tin catalyst or other catalyst which can cause reversion. The advantage of not using a catalyst is that the compositions are less expensive, the cured products do not revert when exposed to heat under confined conditions, the composition has improved storage stability, the composition has better weatherability, flame retardancy, and oil stability. The compositions of the present invention without the use of a catalyst have faster skin over times and tack free times than when vinyltriketoximosilanes or methyltriketoximosilanes are used as the crosslinker. The compositions of the present invention have better adhesion to metals such as aluminum and steel than similar compositions which have methoxy-ketoximo silanes as the crosslinker. The compositions of the present invention do not bubble when cured under hot conditions as do the methoxy-ketoximo silanes do, where the hot conditions are temperatures such as above 100° C. The compositions of the present invention, without catalyst, can have a modulus determined by selecting a specific mixture of tetrafunctional ethoxy-ketoximo silanes to provide the kind of modulus value desired. The modulus of the cured products can be varied by changing the silane mixture in (B) if a curing catalyst is not used. Thus, increasing the amount of triethoxymonoketoximosilane in a mixture of (B) will decrease the modulus of the cured product. The presence of a catalyst in a composition will under most situations cause the silane mixture of (B) to act like a tetrafunctional silane whereas when no catalyst is present the silane mixture of (B) takes on a characteristic of a silane less than tetrafunctional depending on the amounts of each silane species present. As stated above, the preferred catalysts, if one must be used, are the organotitanates because they are not catalysts which can cause reversion. The cured products of the compositions of this invention also exhibit resistance to oils and other solvents such as glycol and water mixtures, such properties would make the compositions of this invention useful as formed-in-place-gaskets for use in automobiles and other machinery which needs gaskets with solvent and oil resistance.

The following examples are present for illustrative purposes and should not be construed as limiting the present invention which is properly delineated in the claims. In the examples, "parts" refers to parts by weight and the viscosities are measured at 25° C.

EXAMPLE 1

Compositions were prepared by adding 78.43 parts of polydimethylsiloxane having 85 percent of the end groups as hydroxyl and 15 percent of the end groups as trimethylsiloxy and having a viscosity of 12.5 Pa.s was mixed in a Ross mixer for 15 minutes and then 9.8 parts of a hydroxyl endblocked polydimethylsiloxane having a viscosity of about 0.08 Pa.s, 8.82 parts of a hydroxyl endblocked polymethylvinylsiloxane having about 5 weight percent hydroxyl groups, and 2.94 parts of a hydroxyl endblocked polymethylphenylsiloxane having about 4.5 weight percent hydroxyl groups was added to the Ross mixer equipped with a steam jacket and then mixed for 10 minutes. To the polymer mixture, 2.25 parts of carbon black was added and mixed for one minute to wet the carbon black and then 5.72 parts of reinforcing silica filler having a surface area of 150 square meters per gram was added to the mixture and mixed until the filler was wet out. Two more 5.72 part-portions of the silica filler were added and mixed until the filler was wet out. After each portion of silica was added the mixing was continued for about 3 to 5 minutes, the time necessary to wet out the silica. The resulting mixture was then mixed for 60 minutes while applying full steam to the jacket and pulling a full vacuum on the mixture. This procedure was used to remove water from the mixture which would enter the system because the filler and also the polymers, but to a lesser extent than the filler, carry water into the composition if precautions are not specifically taken to remove it. The steam was turned off and cooling water was used in the jacket which continued for 10 minutes. The mixture at this point was designated base mixture. This base mixture was transferred to a mixer which protects the composition from being exposed to atmospheric moisture and is known as a Semco mixer. To the mixture in the Semco mixer, 12.94 parts of a tetrafunctional ethoxy-ketoximo silane mixture was added as the crosslinker and the mixture was given 150 strokes to mix the contents. The composition was then put into a container which protected it from the entrance of moisture. This tetrafunctional ethoxy-ketoximo silane contained 77 weight percent of tetra(methylethylketoximo)silane, 18 weight percent monoethoxytri(methylethylketoximo)silane, 1 weight percent diethoxydi(methylethylketoximo)silane, and 4 weight percent high boiling unknown materials.

The silane mixture was prepared by mixing 68.4 parts of tetraethoxysilane, 130.5 parts of methylethylketoxime, and 160.0 parts of toluene which had been dried over molecular sieves. This mixture was in a reflux pot which was heated to a pot temperature of 158° C. and a head temperature of 109° C. over a time period of 21.5 hours. The residue was further distilled at a pressure of 15 mm Hg to a head temperature of 95° C. The pot temperature reached 165° C. The resulting mixture had the composition as stated above which was a 93 percent yield. The mixture was identified by gas liquid chromatography. The mixture was dark in color because of the high temperature during the distillation procedure used to remove toluene and some of the ethoxy silane species. Other silane mixtures were prepared by this same method by removing less ethanol (less time at reflux) provided smaller amounts of the tetraketoximo and triketoximo silanes in the mixture. Also by not distilling the resulting product, amounts of unreacted ketoxime would sometimes be found in the silane mixture. The other silane mixtures in these examples including the methoxy-ketoximo silane were prepared by this method by varying the conditions.

Specimens of the above composition were prepared by making slabs by the draw-down method using a chase having a 1/16 inch depth which was exposed to moisture and the following properties were measured. The skin over time (SOT) was measured by observing the time from exposure of the composition to moisture until a finger lightly touched to the surface of the curing composition was withdrawn without transfer of the composition to the finger. The tack free time (TFT) was the time measured from the exposure of the composition until a dry surface, free from tack was obtained. The curing composition was observed to see if any cracking occurred during the curing process. A film of the cured composition was nicked with a knife and then force was applied to both sides of the nick and whether a tear was propagated was observed and was termed tear propagation.

Other specimens were obtained as described above and were allowed to cure at 77° C. and 50% relative humidity for 7 days and then the following properties were measured. The durometer on the Shore A scale was determined according to ASTM Standard D-2240, the tensile strength at break and the elongation at break were determined according to ASTM Standard D-412. The heat stability was also observed by heating cured specimens at 260° C. for 24 hours and then determining the durometer, tensile strength, and elongation. The oil resistance was determined by immersing cured specimens in 5W30 motor oil heated at a temperature of 150°

C. for 14 days and then the durometer, tensile strength, and elongation were determined. The resistance to a water-glycol mixture was determined by immersing cured specimens in a mixture of 50 weight percent water and 50 weight percent glycol heated at 121° C. for 14 days and then the durometer, tensile strength, and elongation were determined. Cured specimens were immersed in 100° C. water for 5 hours and then the durometer, tensile strength, and elongation were determined. The lapshear for aluminum and steel were also determined on the compositions according to ASTM Standard D-816. The specimens for the lapshear test were cured for 14 days at room temperature, the composition thickness between the metal pieces was about 0.0508 cm, and the overlap was 1.27 cm. The results were as shown in Table I in which this composition is referred to as Composition A. Those specimen which were immersed in hot fluids were removed from the hot fluid after the proper aging period, placed in the same fluid which was at room temperature and when the specimen had cooled to room temperature the properties were measured.

For comparative purposes, compositions were prepared by substituting for the crosslinker in Composition A the following:

Composition B—12.94 parts of methyltri(methylethylketoximo)silane, 2.55 parts of an adhesion promoter of the formula

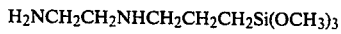

and 0.529 part of dibutyltindilaurate as curing catalyst (reversion catalyst);

Composition C—12.94 parts of methyltri(methylethylketoximo)silane, 2.55 parts of the adhesion promoter as described for Composition B, and 0.0529 part of dibutyltindilaurate;

Composition D—12.94 parts of methyltri(methylethylketoximo)silane, and 2.55 parts of the adhesion promoter as described for Composition B;

Composition E—12.94 parts of methyltri(methylethylketoximo)silane, and 0.529 part of dibutyltindilaurate;

Composition F—12.94 parts of methyltri(methylethylketoximo)silane;

Composition G—12.94 parts of vinyltri(methylethylketoximo)silane and 2.55 parts of the adhesion promoter as described in Composition B;

Composition H—12.94 parts of vinyltri(methylethylketoximo)silane;

Composition I—12.94 parts of tetra(methylethylketoximo)silane, and 2.55 parts of the adhesion promoter as described for Composition B;

Composition J—12.94 parts of a tetrafunctional methoxyketoximo silane mixture containing 66.4 weight percent of tetra(methylethylketoximo)silane, 28.5 weight percent monomethoxytri(methylethylketoximo)silane, 1.2 weight percent dimethoxydi(methylethylketoximo)silane, and 3.9 weight percent high boiling unknown materials.

Compositions B, C, D, E, F, G, H, I, and J were tested in the same manner as Composition A with the results as shown in Table I.

TABLE I

| | Compositions | | | | | | | | | |
|---|---|---|---|---|---|---|---|---|---|---|
| | A | B* | C* | D* | E* | F* | G* | H* | I* | J* |
| Physical Properties | | | | | | | | | | |
| SOT, minutes | 1 | 9 | 18 | 19 | 12 | ** | 7 | 14 | 3 | 1 |
| TFT, minutes | 3 | 18 | 28 | 43 | 20 | ** | 15 | 50 | 5 | 3 |
| Cracking | no | no | yes | yes | no | ** | no | no | no | no |
| Tear propagation | no | yes | no | no | yes | ** | no | no | no | no |
| 7 days @ RT | | | | | | | | | | |
| Durometer, Shore A | 54 | 61 | 51 | 31 | 40 | ** | 45 | 35 | 50 | 52 |
| Tensile, kPa | 3057 | 2648 | 2847 | 689 | 2827 | ** | 2586 | 2344 | 3034 | 3358 |
| Elongation, % | 137 | 180 | 160 | 20 | 105 | ** | 185 | 295 | 110 | 143 |
| 24 hrs. @ 260° C. | | | | | | | | | | |
| Durometer, Shore A | 58 | 72 | 50 | 65 | 58 | — | 62 | 46 | 53 | — |
| Tensile, kPa | 1986 | 3123 | 2413 | 2710 | 2461 | — | 2648 | 2848 | 2365 | — |
| Elongation, % | 140 | 100 | 100 | 130 | 70 | — | 110 | 150 | 120 | — |
| 14 days @ 150° C. in 5W30 Oil | | | | | | | | | | |
| Durometer, Shore A | 29 | 38 | 31 | 27 | 36 | — | 20 | 22 | 24 | 33 |
| Tensile, kPa | 1944 | 2068 | 1724 | 1172 | 1379 | — | 827 | 1862 | 1103 | 1806 |
| Elongation, % | 178 | 90 | 150 | 145 | 50 | — | 160 | 250 | 100 | 187 |
| 14 days @ 121° C. in 50/50 Glycol/water | | | | | | | | | | |
| Durometer, Shore A | 45 | 57 | 40 | 48 | 43 | — | 31 | 37 | 28 | 44 |
| Tensile, kPa | 2213 | 2206 | 1469 | 1503 | 1538 | — | 676 | 3792 | 490 | 2910 |
| Elongation, % | 156 | 240 | 310 | 350 | 100 | — | 370 | 350 | 150 | 199 |
| 5 hrs. @ 100° C. in water | | | | | | | | | | |
| Durometer, Shore A | — | 55 | 43 | 48 | 43 | — | 34 | 38 | 35 | — |
| Tensile, kPa | — | 2923 | 2613 | 1620 | 2255 | — | 1379 | 2758 | 1227 | — |
| Elongation, % | — | 230 | 280 | 250 | 130 | — | 300 | 280 | 330 | — |
| Lapshear | | | | | | | | | | |
| Alum, k newton/meter | 26.97 | 55.69 | — | — | — | — | 49.04 | — | 48.69 | 32.22 |
| Steel, k newton/meter | 0.35 | 39.40 | — | — | — | — | 43.08 | — | 38.53 | 0.35 |

*Comparative examples
**Sample was still tacky after 14 days at room temperature In Table I the results show that all the compositions cure slower as shown by the skin over times and the tack free times, except for Composition J. Compositions B, C, D, and E exhibited cracking upon curing and the cured specimens exhibited tear propagation. The elongation of B and E showed a considerable loss in hot motor oil. Composition F did not cure in 14 days at room temperature as shown by the fact that the specimen was still tacky after that period of time. Compositions D and H were very slow curing. Compositions G and I showed a significant loss of tensile strength in hot motor oil and in the hot glycol/water mixture (coolant). Composition J showed good properties but is not desirable because it involved the use of the toxic methoxy species of crosslinkers. As shown by the comparative compositions, the compositions of the present invention have the best property profile.

EXAMPLE 2

Compositions were prepared as described in Example 2 for making the base mixture, however the crosslinking composition for these compositions were prepared by mixing the crosslinker, adhesion promoter, and curing catalyst and allowing this mixture to stand 5 to 10 minutes at room temperature under conditions which did not allow moisture to contact the ingredients before the crosslinking composition was mixed with the base mixture. The crosslinking composition in the amounts shown below was mixed with 119.4 parts of base mixture. The lapshear tests were conducted on specimens where the metal pieces had been immersed in 5W30 motor oil or in drawing oil. The oil was then allowed to drain from the metal pieces and then the test specimens were made as described in Example 1. The heat stability of the cured specimens was also measured at 150° C. for 14 days. The compositions are identified below by the crosslinking compositions which were used to make the compositions:

Composition K—12.94 parts of a tetrafunctional ethoxy-ketoximo silane mixture having 50.9 weight percent monoethoxytri(methylethylketoximo)silane, 40.2 weight percent diethoxydi(methylethylketoximo)silane, 5.4 weight percent triethoxymono(methylethylketoximo)silane, and 2.5 weight percent unreacted methylethylketoxime, 1.327 parts of an adhesion promoter of the formula

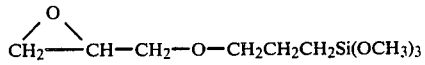

and 0.013 part of tetrabutyltitanate as curing catalyst.

Composition L—12.94 parts of a tetrafunctional ethoxy-ketoximo silane mixture having 13.0 weight percent of tetra(methylethylketoximo)silane, 56.3 weight percent of monoethoxytri(methylethylketoximo)silane, 22.7 weight percent of diethoxydi(methylethylketoximo)silane, 3.0 weight percent of triethoxymono(methylethylketoximo)silane, and 4.8 weight percent of unreacted methylethylketoxime, 1.327 parts of the adhesion promoter as described for Composition K, and 0.013 part of tetrabutyltitanate.

Composition M—12.94 parts of a tetrafunctional ethoxy-ketoximo silane mixture having 41.5 weight percent tetra(methylethylketoximo)silane, 41.1 weight percent monoethoxytri(methylethylketoximo)silane, 4.3 weight percent diethoxydi(methylethylketoximo)silane, and 12.9 weight percent unreacted methylethylketoxime, 1.327 parts of the adhesion promoter as described for Composition K, and 0.013 part of tetrabutyltitanate.

Composition N—12.94 parts of a tetrafunctional ethoxy-ketoximo silane mixture having 66 weight percent tetra(methylethylketoximo)silane and 33 weight percent monoethoxytri(methylethylketoximo)silane, 1.327 parts of the adhesion promoter as described for Composition K, and 0.013 part of tetrabutyltitanate.

The following compositions were made using a methoxy containing composition and are presented for comparative purposes.

Composition O—12.94 parts of a tetrafunctional methoxyketoximo silane mixture having 12.4 weight percent tetra(methylethylketoximo)silane, 59.5 weight percent monomethoxytri(methylethylketoximo)silane, and 28.4 weight percent dimethoxydi(methylethylketoximo)silane, 1.327 parts of the adhesion promotor as described for Composition K, and 0.013 part of tetrabutyltitanate.

Composition P—12.94 parts of a tetrafunctional methoxyketoximo silane mixture having 17.3 weight percent tetra(methylethylketoximo)silane, 55.6 weight percent monomethoxytri(methylethylketoximo)silane, and 18.7 weight percent dimethoxydi(methylethylketoximo)silane, 1.327 parts of the adhesion promoter as described for Composition K, and 0.013 part of tetrabutyltitanate.

Composition Q—12.94 parts of a tetrafunctional methoxyketoximo silane mixture having 32.2 weight percent tetra(methylethylketoximo)silane, 47.1 weight percent monomethoxytri(methylethylketoximo)silane, and 9.1 weight percent dimethoxydi(methylethylketoximo)silane, 1.327 parts of the adhesion promoter as described for Composition K, and 0.013 part of tetrabutyltitanate.

Composition R—12.94 parts of a tetrafunctional methoxyketoximo silane mixture having 47.5 weight percent tetra(methylethylketoximo)silane and 34.9 weight percent monomethoxytri(methylethylketoximo)silane, 1.327 parts of the adhesion promoter as described for Composition K, and 0.013 part of tetrabutyltitanate.

The compositions were tested and the results of the tests were as shown in Table II.

TABLE II

|  | Compositions | | | | | | | |
| --- | --- | --- | --- | --- | --- | --- | --- | --- |
|  | K | L | M | N | O* | P* | Q* | R* |
| Physical Properties | | | | | | | | |
| Specific Gravity | 1.08 | 1.08 | 1.08 | 1.08 | 1.08 | 1.08 | 1.08 | 1.09 |
| TFT, minutes | 25 | 25 | 23 | 22 | 10 | 10 | 10 | 10 |
| Extrusion Rate, g/min. | 320 | 314 | 217 | 238 | 254 | 224 | 239 | 205 |
| 7 days @ RT | | | | | | | | |
| Durometer, Shore A | 45 | 50 | 57 | 59 | 48 | 50 | 51 | 59 |
| Tensile, k Pa.s | 1792 | 3172 | 3047 | 2972 | 2827 | 2758 | 2592 | 3116 |
| Elongation, % | 109 | 178 | 153 | 147 | 157 | 150 | 128 | 161 |
| 14 days @ 150° C. | | | | | | | | |
| Durometer, Shore A | 53 | 55 | 48 | 57 | 57 | 47 | 44 | 43 |
| Tensile, k Pa.s | 2875 | 2737 | 3075 | 3020 | 3420 | 2696 | 2406 | 2875 |
| Elongation, % | 184 | 132 | 139 | 151 | 140 | 138 | 121 | 147 |
| 24 hrs. @ 260° C. | | | | | | | | |
| Durometer, Shore A | 60 | 58 | 63 | 58 | 63 | 58 | 58 | 57 |

TABLE II-continued

| | Compositions | | | | | | | |
|---|---|---|---|---|---|---|---|---|
| | K | L | M | N | O* | P* | Q* | R* |
| Tensile, k Pa.s | 2648 | 2834 | 2496 | 2985 | 2068 | 2627 | 2620 | 2627 |
| Elongation, % | 97 | 114 | 125 | 160 | 78 | 121 | 124 | 122 |
| 14 days @ 150° C. in 5W30 Oil | | | | | | | | |
| Durometer, Shore A | 38 | 37 | 36 | 38 | 34 | 35 | 38 | 40 |
| Tensile, k Pa.s | 1772 | 1620 | 1751 | 1758 | 2027 | 2027 | 1931 | 2599 |
| Elongation, % | 176 | 153 | 162 | 163 | 228 | 187 | 199 | 218 |
| Volume swell, % | 32.1 | 32.7 | 31.8 | 32.4 | 31.3 | 29.6 | 29.8 | 28.1 |
| 14 days @ 121° C. in 50/50 Glycol/water | | | | | | | | |
| Durometer, Shore A | 41 | 46 | 49 | 46 | 48 | 45 | 48 | 50 |
| Tensile, k Pa.s | 1551 | 1731 | 1710 | 1662 | 1572 | 1558 | 1799 | 1951 |
| Elongation, % | 153 | 153 | 148 | 137 | 132 | 124 | 148 | 154 |
| Volume swell, % | −1.3 | −2.1 | −1.5 | −2.3 | −1.5 | −1.9 | −0.8 | −2.3 |
| Lapshear Clean | | | | | | | | |
| Alum., kN/m-% CF** | 55.69/85 | 52.71/85 | 55.34/85 | 54.29/90 | 47.63/90 | 50.09/40 | 50.79/50 | 52.19/85 |
| Steel, kN/m-% CF | 40.80/65 | 40.10/70 | 51.49/65 | 37.38/55 | 34.68/95 | 27.32/3 | 36.78/3 | 36.78/3 |
| 5W30 Oil | | | | | | | | |
| Alum., kN/m-% CF | 18.56/55 | 19.44/40 | 14.36/0 | 15.41/0 | 15.41/0 | 11.91/0 | 11.56/0 | 9.81/0 |
| Steel, kN/m-% CF | 16.81/30 | 14.36/30 | 7.01/0 | 0.44/0 | 11.21/0 | 5.60/0 | 3.85/0 | 2.10/0 |
| Drawing Oil | | | | | | | | |
| Alum., kN/m-% CF | 32.92/55 | 24.17/55 | 0.22/0 | nil/0 | 14.71/5 | 6.30/0 | 3.85/0 | nil/0 |
| Steel, kN/m-% CF | 15.76/45 | 12.96/50 | nil/0 | nil/0 | nil/0 | nil/0 | nil/0 | nil/0 |

*Comparative examples
**CF = cohesive failure

In Table II, Compositions K, L, M, and N contain ethoxy groups and showed better adhesion than the comparative Compositions O, P, Q, and R which were made using methoxy cross-linking species. The compositions of the present invention showed significant adhesion improvement when the metal to which the compositions were deposited were contaminated with oils.

EXAMPLE III

Compositions were prepared by mixing 100 parts of a hydroxyl endblocked polydimethylsiloxane having a viscosity of about 5000 cp with 4 parts of a crosslinker as described below. The compositions were exposed to moisture and the skin over times and the tack free times were determined.

Composition S used a tetrafunctional ethoxy-ketoximo silane mixture having 2.5 weight percent tetra(methylethylketoximo)silane, 44.1 weight percent monoethoxytri(methylethylketoximo)silane, 44.9 weight percent diethoxydi(methylethylketoximo)silane, and 8.5 weight percent triethoxymono(methylethylketoximo)silane. Composition S had a skin over time of 126 minutes and a tack free time of 210 minutes.

Composition T used a tetrafunctional ethoxy-ketoximo silane mixture having 11.6 weight percent tetra(methylethylketoximo)silane, 62.8 weight percent monoethoxytri(methylethylketoximo)silane, 24.6 weight percent diethoxydi(methylethylketoximo)silane, and 1.0 weight percent triethoxymono(methylethylketoximo)silane. Composition T had a skin over time of 53 minutes and a tack free time of 120 minutes.

Composition U used a tetrafunctional ethoxy-ketoximo silane mixture having 19.7 weight percent tetra(methylethylketoximo)silane, 58.8 weight percent monoethoxytri(methylethyl- . ketoximo)silane, 20.2 weight percent diethoxydi(methylethylketoximo)silane, and 1.3 weight percent triethoxymono(methylethylketoximo)silane. Composition U had a skin over time of 37 minutes and a tack free time of 101 minutes.

Composition V used a tetrafunctional ethoxy-ketoximo silane mixture having 29.3 weight percent tetra(methylethylketoximo)silane, 56.6 weight percent monoethoxytri(methylethylketoximo)silane, 13.7 weight percent diethoxydi(methylethylketoximo)silane, and 0.4 weight percent triethoxymono(methylethylketoximo)silane. Composition V had a skin over time of 18 minutes and a tack free time of 67 minutes.

Composition W used vinyltri(methylethylketoximo)silane and had a skin over time of 178 minutes and a tack free time of 210 minutes.

Composition X used methyltri(methylethylketoximo)silane and had a skin over time of about 15 hours and a tack free time of about 35 hours.

Composition Y used a tetrafunctional ethoxy-ketoximo silane mixture having 40 weight percent tetra(methylethylketoximo)silane, 51 weight percent monoethoxytri(methylethylketoximo)silane, and 9 weight percent diethoxydi(methylethylketoximo)silane. Composition Y had a skin over time of 14 minutes and a tack free time of 27 minutes.

Composition Z used a tetrafunctional ethoxy-ketoximo silane mixture having 11 weight percent tetra(methylethylketoximo)silane, 65 weight percent monoethoxytri(methylethylketoximo)silane, 23 weight percent diethoxydi(methylethylketoximo)silane, and 1 weight percent triethoxymono(methylethylketoximo)silane. Composition Z had a skin over time of 30 minutes and a tack free time of 71 minutes.

That which is claimed is:

1. A composition comprising a product which is storage stable in a package when protected from moisture but cures when removed from the package and exposed to moisture and which is obtained by mixing the following ingredients
    (A) a hydroxyl endblocked polydiorganosiloxane having an average viscosity at 25° C. of from 0.5 to 100 Pa.s and the organic radicals bonded to the silicon atom are selected from the group consisting of monovalent hydrocarbon radicals and monovalent halogenated hydrocarbon radicals, and
    (B) a tetrafunctional ethoxy-ketoximo silane mixture of 0 to 80 weight percent of tetraketoximosilane, 20 to 70 weight percent of monoethoxytriketoximosilane, 1 to 60 weight percent of diethoxydiketoximosilane, and 0 to 20 weight percent triethoxymonoketoximosilane in which the ketoximo groups have a formula —O—N=CR'R' in which each R' is an alkyl radical having from 1 to 4 carbon atoms, the amount of ingredient (B) being present in an amount sufficient to provide at least 0.8 moles of tetrafunctional ethoxy-ketoximo silane per mole of hydroxyl group in (A).

2. The composition according to claim 1 in which the tetraketoximosilane is present in an amount of from 2 to 40 weight percent, the monoethoxytriketoximosilane is present in an amount of from 45 to 65 weight percent, the diethoxydiketoximosilane is present in an amount of from 8 to 45 weight percent, and the triethoxymonoketoximosilane is present in an amount of from 0 to 8 weight percent.

3. The composition according to claim 2 in which the tetraketoximosilane is present in an amount of from 5 to 15 weight percent, the monoethoxytriketoximosilane is present in an amount of from 55 to 60 weight percent, the diethoxydiketoximosilane is present in an amount of from 22 to 35 weight percent, and the triethoxymonoketoximosilane is present in an amount of from 1 to 3 weight percent.

4. The composition according to claim 1 in which ingredient (A) is a mixture of hydroxyl endblocked polydiorganosiloxanes of different viscosities.

5. The composition according to claim 2 in which ingredient (A) is a mixture of hydroxyl endblocked polydiorganosiloxane of different viscosities.

6. The composition according to claim 3 in which ingredient (A) is a mixture of hydroxyl endblocked polydiorganosiloxane of different viscosities.

7. The composition according to claim 1 further comprising a filler.

8. The composition according to claim 2 further comprising a filler.

9. The composition according to claim 3 further comprising a filler.

10. The composition according to claim 4 further comprising a filler.

11. The composition according to claim 5 further comprising a filler.

12. The composition according to claim 6 further comprising a filler.

13. The composition according to claim 1 further comprising a curing catalyst.

14. The composition according to claim 2 further comprising a curing catalyst.

15. The composition according to claim 3 further comprising a curing catalyst.

16. The composition according to claim 10 further comprising a curing catalyst.

17. The composition according to claim 12 further comprising a curing catalyst.

18. The composition according to claim 13 in which the curing catalyst is a non-reversion catalyst.

19. The composition according to claim 14 in which the curing catalyst is a non-reversion catalyst.

20. The composition according to claim 15 in which the curing catalyst is a non-reversion catalyst.

21. The composition according to claim 16 in which the curing catalyst is a non-reversion catalyst.

22. The composition according to claim 17 in which the curing catalyst is a non-reversion catalyst.

23. The composition according to claim 18 in which the non-reversion catalyst is an organotitanate.

24. The composition according to claim 21 in which the non-reversion catalyst is an organotitanate.

25. The composition according to claim 22 in which the non-reversion catalyst is an organotitanate.

26. The composition according to claim 24 in which the filler is selected from the group consisting of reinforcing silica, calcium carbonate, and mixtures thereof.

27. The composition according to claim 25 in which the filler is selected from the group consisting of reinforcing silica, calcium carbonate, and mixtures thereof.

28. The composition according to claim 1 in which the amount of ingredient (B) is present in an amount sufficient to provide at least 1.0 mole of the tetrafunctional ethoxyketoximo silane per mole of hydroxyl group in (A).

29. The composition according to claim 2 in which the amount of ingredient (B) is present in an amount sufficient to provide at least 1.0 mole of the tetrafunctional ethoxyketoximo silane per mole of hydroxyl group in (A).

30. The composition according to claim 3 in which the amount of ingredient (B) is present in an amount sufficient to provide at least 1.0 mole of the tetrafunctional ethoxyketoximo silane per mole of hydroxyl group in (A).

31. The composition according to claim 4 in which the amount of ingredient (B) is present in an amount sufficient to provide at least 1.0 mole of the tetrafunctional ethoxyketoximo silane per mole of hydroxyl group in (A).

32. The composition according to claim 6 in which the amount of ingredient (B) is present in an amount sufficient to provide at least 1.0 mole of the tetrafunctional ethoxyketoximo silane per mole of hydroxyl group in (A).

33. The composition according to claim 7 in which the amount of ingredient (B) is present in an amount sufficient to provide at least 1.0 mole of the tetrafunctional ethoxyketoximo silane per mole of hydroxyl group in (A).

34. The composition according to claim 9 in which the amount of ingredient (B) is present in an amount sufficient to provide at least 1.0 mole of the tetrafunctional ethoxyketoximo silane per mole of hydroxyl group in (A).

35. The composition according to claim 13 in which the amount of ingredient (B) is present in an amount sufficient to provide at least 1.0 mole of the tetrafunctional ethoxyketoximo silane per mole of hydroxyl group in (A).

36. The composition according to claim 18 in which the amount of ingredient (B) is present in an amount sufficient to provide at least 1.0 mole of the tetrafunctional ethoxyketoximo silane per mole of hydroxyl group in (A).

37. The composition according to claim 23 in which the amount of ingredient (B) is present in an amount sufficient to provide at least 1.0 mole of the tetrafunctional ethoxyketoximo silane per mole of hydroxyl group in (A).

38. The composition according to claim 27 in which the amount of ingredient (B) is present in an amount sufficient to provide at least 1.0 mole of the tetrafunctional ethoxyketoximo silane per mole of hydroxyl group in (A).

39. The composition according to claim 1 in which the hydroxyl endblocked polydiorganosiloxane of (A) is partially endblocked with triorganosiloxy units and with hydroxyl groups.

40. The composition according to claim 4 in which the hydroxyl endblocked polydiorganosiloxane of (A) is partially endblocked with triorganosiloxy units and with hydroxyl groups.

41. The composition according to claim 7 in which the hydroxyl endblocked polydiorganosiloxane of (A) is partially endblocked with triorganosiloxy units and with hydroxyl groups.

42. The composition according to claim 13 in which the hydroxyl endblocked polydiorganosiloxane of (A) is partially endblocked with triorganosiloxy units and with hydroxyl groups.

43. The composition according to claim 26 in which the hydroxyl endblocked polydiorganosiloxane of (A) is partially endblocked with triorganosiloxy units and with hydroxyl groups.

44. The composition according to claim 38 in which the hydroxyl endblocked polydiorganosiloxane of (A) is partially endblocked with triorganosiloxy units and with hydroxyl groups.

* * * * *